United States Patent
Homant et al.

(10) Patent No.: US 9,903,299 B2
(45) Date of Patent: Feb. 27, 2018

(54) METHODS AND SYSTEMS FOR POWER TAKE OFF DEVICE TORQUE DELIVERY

(71) Applicant: Ford Global Technologies, LLC, Dearborn, MI (US)

(72) Inventors: Dennis E. Homant, Farmington Hills, MI (US); Bradley Dean Riedle, Northville, MI (US); David James Liller, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/192,581

(22) Filed: Jun. 24, 2016

(65) Prior Publication Data
US 2017/0370319 A1    Dec. 28, 2017

(51) Int. Cl.
| F02D 41/02 | (2006.01) |
| F02D 41/26 | (2006.01) |
| B60K 25/02 | (2006.01) |
| F02B 67/04 | (2006.01) |
| F02D 41/00 | (2006.01) |
| F02D 41/30 | (2006.01) |

(52) U.S. Cl.
CPC .............. *F02D 41/26* (2013.01); *B60K 25/02* (2013.01); *F02B 67/04* (2013.01); *F02D 41/0002* (2013.01); *F02D 41/0097* (2013.01); *F02D 41/3005* (2013.01); *F02D 41/3064* (2013.01); *F02D 2250/21* (2013.01); *F02D 2400/12* (2013.01)

(58) Field of Classification Search
CPC .. F02D 41/26; F02D 41/3064; F02D 41/0097; F02D 41/0002; F02D 41/3005; F02D 41/10; F02D 41/045; F02D 2400/12; F02D 2250/18; F02D 2250/21; F02B 67/04; B60K 25/02; G01M 15/042; G01M 15/044

USPC .............. 123/436, 492; 701/110; 73/114.24, 73/114.25
See application file for complete search history.

(56) References Cited

U.S. PATENT DOCUMENTS

| 6,553,302 | B2 * | 4/2003 | Goodnight | ............ | B60W 10/10 172/3 |
| 7,377,103 | B2 | 5/2008 | Yu et al. | | |
| 7,931,560 | B2 | 4/2011 | Karlsson et al. | | |
| 8,046,140 | B2 * | 10/2011 | Romine | ................. | B60K 17/28 180/170 |
| 8,182,395 | B2 * | 5/2012 | Jonsson | ................. | B60K 25/06 477/107 |
| 2008/0194383 | A1 * | 8/2008 | Berglund | ............... | B60K 25/06 477/97 |

FOREIGN PATENT DOCUMENTS

| WO | 2004062957 A1 | 7/2004 |
| WO | 2007030070 A1 | 3/2007 |

* cited by examiner

*Primary Examiner* — Hai Huynh
(74) *Attorney, Agent, or Firm* — Julia Voutyras; McCoy Russell LLP (57) ABSTRACT

Methods and systems are provided for controlling a vehicle engine to deliver desired torque to a power take off device coupled to the engine. In one example, the method may include, learning a filtered PTO torque demand during vehicle acceleration, and steady state operation, and during transition in engine states using the learned PTO torque demand to adjust engine speed in order to deliver a desired engine torque output for optimal operation of the PTO device.

19 Claims, 6 Drawing Sheets

METHODS AND SYSTEMS FOR POWER TAKE OFF DEVICE TORQUE DELIVERY

FIELD

The present description relates generally to methods and systems for controlling a vehicle engine to deliver desired torque to a power take off device coupled to the engine.

BACKGROUND/SUMMARY

A power take off (PTO) device may be coupled to vehicles for providing power to run accessories such as cement mixers, trash compactors, harvesters, snow ploughs, etc. The PTO may be coupled to the vehicle engine via a drive shaft and may directly derive operational power from engine torque output. During PTO device operation, the engine may be operated at a requested (higher) speed in order to provide a desired torque based on the PTO load.

Various approaches for operating a PTO device have been developed. One example approach shown by Yu et al. in U.S. Pat. No. 7,377,103 discloses a method for PTO device operation wherein power delivery to a PTO device from an engine is initiated upon confirmation that the torque output of the engine is higher than the torque demand of the PTO device. Once a PTO mode is activated by an operator, the engine controller may adjust air and fuel to the engine to maintain the engine speed at an engine speed level required for PTO operation. As such, the PTO device is operated while the vehicle is stationary such that the engine output is adjusted based on the varying PTO load.

However, the inventors herein have recognized potential issues with such systems. As one example, the approach of Yu may not be used while the vehicle is mobile. In particular, an operator may need to propel the vehicle while operating the PTO device. As a result, the engine torque output may need to be adjusted not only for the variation in PTO load but also for the variation in wheel torque during acceleration as well as during deceleration events. If sufficient torque is not provided during tip-in events, the vehicle may appear sluggish and/or the performance of the PTO may degrade. On the other hand, during vehicle deceleration (tip-out of the accelerator pedal), the operator may not be able to optimize pedal position and the engine controller may decrease the engine speed (in view of the decreased driver demand) below the speed desired to sustain the PTO load. As a result, the engine may stall. Therefore, while operating a PTO device, vehicle propulsion including transitions between vehicle accelerating modes and decelerating modes may not be seamless.

In one example, the issues described above may be addressed by a method for a vehicle with a power take off (PTO) device coupled to an engine, comprising: estimating a PTO load based on a difference between engine torque output and torque converter torque output; and adjusting engine torque output based on the estimated PTO load during a transition between engine states. In this way, during vehicle acceleration, a demand for PTO torque may be estimated and used as input for engine speed and torque control during vehicle deceleration events.

As one example, a vehicle may include an engine and a PTO device coupled to the engine. The engine may be coupled to vehicle wheels via a torque converter and a transmission system. A vehicle control system may adjust an engine speed profile based on PTO torque demands as well as vehicle propulsion demands. A vehicle operator may actuate a switch to select between a static PTO mode of operation, wherein a PTO device is operated while the vehicle is stationary, and a mobile PTO mode of operation, wherein the PTO device is operated with the vehicle in motion (vehicle propelled using engine torque). When in the static PTO mode, the controller may adjust each of a throttle position, a spark timing, and a fueling schedule of the engine to adjust the engine speed and engine torque output based on a varying load of the PTO device. If the operator tips in while in the stationary mode, the stationary mode may be exited and the PTO load may not be supported by the engine. Instead, the engine output may be used to propel the vehicle. In the mobile PTO operation mode, during vehicle acceleration events, a raw unfiltered PTO torque demand may be estimated based on engine torque output relative to torque converter torque output. Fluctuations in the PTO torque demand may be estimated and a filtered PTO torque demand may be computed using a variable time constant. The filtered PTO torque demand may be used by the controller in conjunction with the driver torque demand to adjust each of the throttle position, the spark timing, and the engine fueling schedule to run the PTO device while also propelling the vehicle. During a subsequent vehicle deceleration event, the PTO torque learned during the preceding acceleration event may be utilized as input to a target engine speed (Ne) controller (e.g., using proportional-integral-derivative (PID) control) that adjusts the engine torque output (commanded torque) such that torque desired by the PTO device continues to be delivered even as the driver demand reduces.

In this way, by learning a PTO torque demand during vehicle acceleration (as such, PTO may be also estimated during constant speed operation, and deceleration), sufficient torque may continue to be delivered to a PTO device during a subsequent deceleration event. For example, engine speed may be reduced at a slower rate than required based on the drop in driver demand. In addition, the PTO device may be optimally operated even as driver demand changes as well as PTO load changes. The technical effect of controlling engine speed during a tip-out event is that torque desired by the PTO device may be delivered by restricting a decrease in engine speed, thereby pre-empting engine stalls. In addition, PTO devices may be operated under all vehicle driving conditions including both stationary and mobile conditions with reduced possibility of engine stalls and stumbles.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
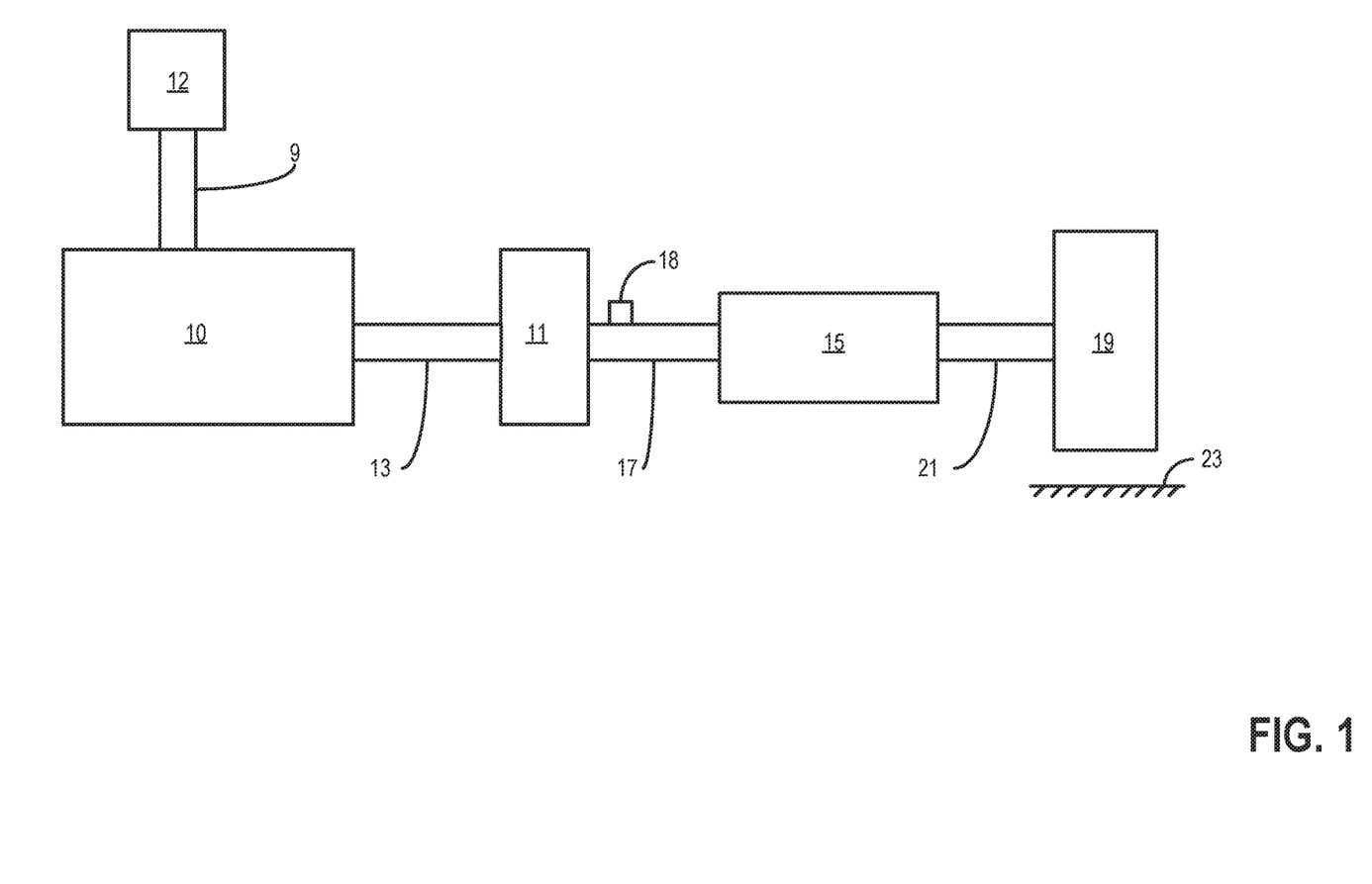
FIG. 1 shows an example vehicle driveline configuration including a power take off (PTO) device.
Figure 2:
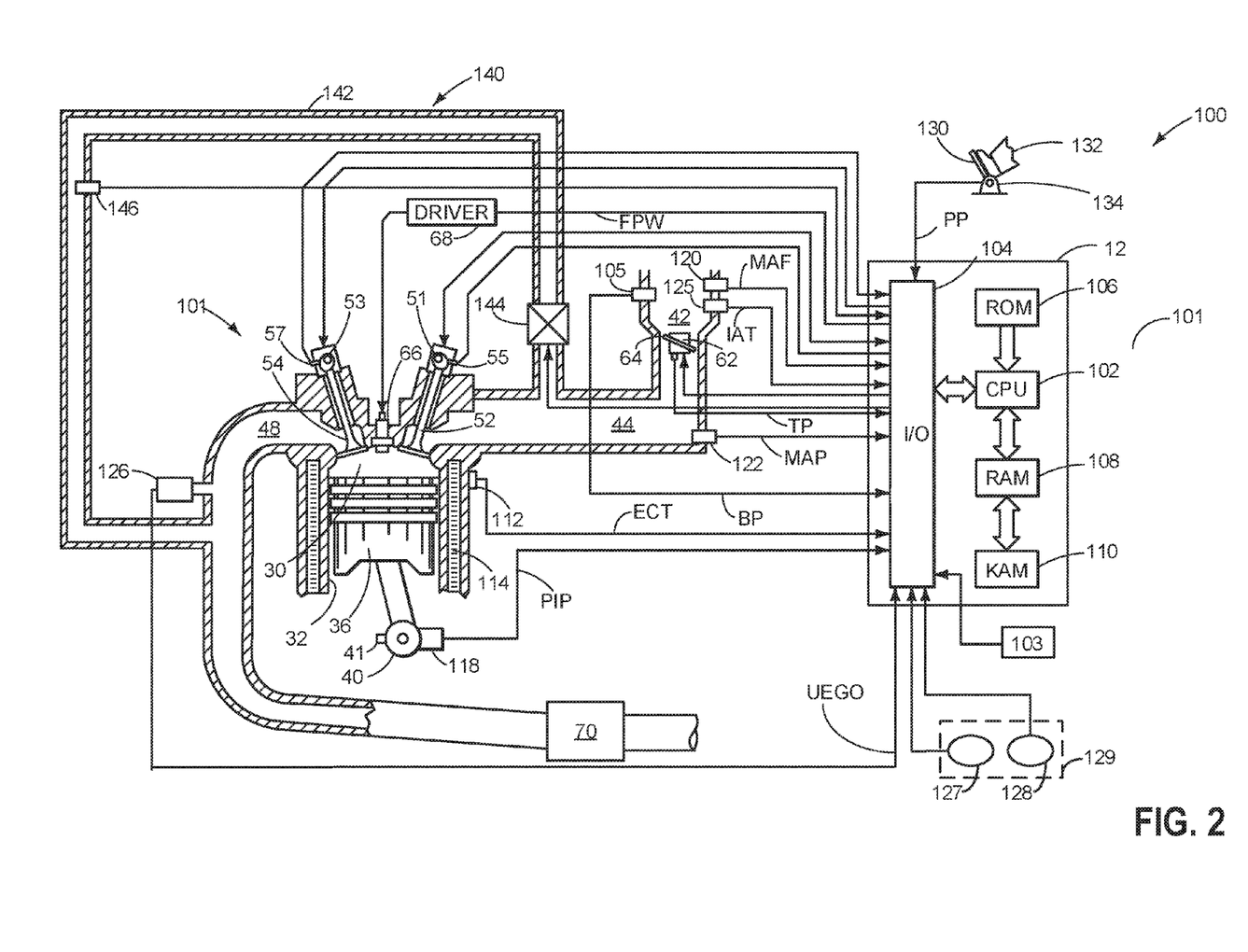
FIG. 2 shows an example embodiment of an engine system.

The following description relates to systems and methods for adjusting engine operating parameters to deliver a desired torque to a power take off device coupled to the engine. An example vehicle driveline configuration with a PTO device coupled to the engine is shown in FIG. 1. An example engine system comprising a controller to operate the PTO device is shown in FIG. 2. The engine controller may be configured to perform control routines, such as the example routines of FIGS. 3 and 4 to operate the PTO device in a static mode and a mobile mode, respectively. An example of PTO operation in the static mode and in the mobile mode including during transitions between engine states (acceleration and deceleration events) is shown in FIG. 5. A control system such as the example PID control system of FIG. 6 may be used for engine speed control during PTO device operation.

FIG. 1 shows an internal combustion engine 10, further described herein with reference to FIG. 2, coupled to torque converter 11 via crankshaft 13. A power take-off (PTO) device such as a cement mixer, a trash compactor, a harvester, or a snow ploughs may be coupled to the engine 10 via a driveshaft 9. The engine may supply power to both the PTO device 12 (when operational) and the torque converter 11. The torque converter 11 may be located downstream (in a torque flow sense) from the PTO device 12 relative to the engine 10. A vehicle control system may adjust an engine speed profile based on PTO torque demands as well as vehicle propulsion demands. Based on user input, the PTO device may be operated when the vehicle is stationary or in motion. A switch on a vehicle dashboard may be used to select between PTO device operation in a static mode (when the vehicle is stationary) or in a mobile mode (when the vehicle is in motion). In the mobile mode, during vehicle acceleration (tip-in) or during vehicle steady-state travel, a PTO load (torque demand) may be learned and engine speed and corresponding engine torque may be adjusted to provide desired PTO torque demand.

A transmission 15 may be coupled downstream of the engine 10 in a driveline via the torque converter 11. The torque converter 11 may be coupled to the transmission 15 via transmission input shaft 17. A speed sensor 18 may be coupled to the transmission input shaft 17 for estimation of torque converter 15 torque output during vehicle operation. Torque converter 11 may have a bypass clutch, which can be engaged, disengaged, or partially engaged. When the clutch is either disengaged or partially engaged, the torque converter is said to be in an unlocked state. When the clutch is completely engaged, the torque converter acts as a driveshaft directly coupling the engine 10 to the transmission 15. Transmission 15 comprises an electronically controlled transmission with a plurality of selectable discrete gear ratios. Transmission 15 also comprises various other gears such as, for example, a final drive ratio (not shown). Transmission 15 may also be coupled to tire 19 via axle 21. Tire 19 interfaces the vehicle (not shown) to the road 23. In a preferred embodiment, transmission 15 has the following driver selectable options: park (P), reverse (R), neutral (N), driver (D), and low (L). The driver selects these positions via a transmission lever. In particular, in park or neutral, transmission 15 does not transmit torque from the transmission input to the output. In drive, a transmission controller can control transmission to select any available forward gear ratios. In reverse, a single reverse gear is selected. In low, only a lower set of forward gear ratios can be selected by the electronic controller. The transmission lever may be located on a steering column or between driver and passenger seats.

FIG. 2 is a schematic diagram showing one cylinder of a multi-cylinder engine 101 in an engine system 100. The engine system may be coupled to a propulsion system such as an on-road vehicle. In one example, engine system 100 may be the internal combustion engine 10 of FIG. 1. A power take-off (PTO) device 103 may be coupled to the engine via a driveshaft. The engine 101 may be controlled at least partially by a control system including a controller 12 and by input from a vehicle operator 132 via an input device 130. In this example, the input device 130 includes an accelerator pedal and a pedal position sensor 134 for generating a proportional pedal position signal PP. Torque generated by the engine may be used for vehicle propulsion and PTO device operation.

The PTO device coupled to the engine may be operated based on input from a vehicle operator 132 via a switch. A switch 127 for selecting a static mode of PTO device operation and a switch 128 for selecting a mobile mode of PTO device operation may be included in a vehicle dashboard 129. The vehicle operator may actuate one of the two switches 127 and 128 to initiate or terminate PTO device operation in a static mode (vehicle stationary) or in a mobile mode (vehicle in motion), respectively.

A combustion chamber (cylinder) 30 of the engine 101 may include combustion chamber walls 32 with a piston 36 positioned therein. The piston 36 may be coupled to a crankshaft 40 so that reciprocating motion of the piston is translated into rotational motion of the crankshaft. A crankshaft speed sensor 41 may be coupled to the crankshaft 40 which may be utilized to measure engine torque output. The crankshaft 40 may be coupled to at least one drive wheel of a vehicle via an intermediate transmission system. Further, a starter motor may be coupled to the crankshaft 40 via a flywheel to enable a starting operation of the engine 101.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some embodiments, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative embodiments, the intake valve 52 and/or exhaust valve 54 may be controlled by electric valve actuation. For example, the combustion chamber 30 may alternatively include an intake valve controlled via electric valve actuation and an exhaust valve controlled via cam actuation including CPS and/or VCT systems.

A fuel injector 66 is shown coupled directly to combustion chamber 30 for injecting fuel directly therein in proportion to the pulse width of signal FPW received from the controller 12 via an electronic driver 68. In this manner, the fuel injector 66 provides what is known as direct injection of fuel into the combustion chamber 30. The fuel injector may be mounted in the side of the combustion chamber or in the top of the combustion chamber (as shown), for example. Fuel may be delivered to the fuel injector 66 by a fuel system (not shown) including a fuel tank, a fuel pump, and a fuel rail. In some embodiments, the combustion chamber 30 may alternatively or additionally include a fuel injector arranged in the intake manifold 44 in a configuration that provides what is known as port injection of fuel into the intake port upstream of the combustion chamber 30.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal TP. Adjustments to the throttle plate 64 position may be carried out for engine speed control. The air intake passage 42 may include the intake air temperature (IAT) sensor 125 and the barometric pressure (BP) sensor 105. The IAT sensor 125 estimates intake air temperature to be used in engine operations and provides a signal to the controller 12. Similarly, the BP sensor 105 estimates the ambient pressure for engine operations and provides a signal to the controller 12. The intake passage 42 may further include a mass air flow sensor 120 and a manifold air pressure sensor 122 for providing respective signals MAF and MAP to the controller 12.

An exhaust gas sensor 126 is shown coupled to the exhaust passage 48 upstream of an emission control device 70. The sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. The emission control device 70 is shown arranged along the exhaust passage 48 downstream of the exhaust gas sensor 126. The device 70 may be a three way catalyst (TWC), NOx trap, various other emission control devices, or combinations thereof. In some embodiments, during operation of the engine 101, the emission control device 70 may be periodically reset by operating at least one cylinder of the engine within a particular air/fuel ratio.

Further, an exhaust gas recirculation (EGR) system 140 may route a desired portion of exhaust gas from the exhaust passage 48 to the intake manifold 44 via an EGR passage 142. The amount of EGR provided to the intake manifold 44 may be varied by the controller 12 via an EGR valve 144. Further, an EGR sensor 146 may be arranged within the EGR passage 142 and may provide an indication of one or more of pressure, temperature, and constituent concentration of the exhaust gas. Under some conditions, the EGR system 140 may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

The controller 12 is shown in FIG. 2 as a microcomputer, including a microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 101 of FIG. 2 and the vehicle system (of FIG. 1), in addition to those signals previously discussed, including measurement of engine torque output from the crankshaft speed sensor 41 coupled to crankshaft 40; torque converter torque output from a transmission input shaft speed sensor (such as sensor 18 of FIG. 1); inducted mass air flow (MAF) from the mass air flow sensor 120; engine coolant temperature (ECT) from a temperature sensor 112 coupled to a cooling sleeve 114; a profile ignition pickup signal (PIP) from a Hall effect sensor 118 (or other type) coupled to crankshaft 40; throttle position (TP) from a throttle position sensor; and absolute manifold pressure signal, MAP, from the sensor 122. Engine speed signal, RPM, may be generated by the controller 12 based on signal PIP, and a torque demand of the PTO device as estimated based on engine torque output and torque converter torque output. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, the sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed. As described above, FIG. 1 shows one cylinder of a multi-cylinder engine, and each cylinder may similarly include its own set of intake/exhaust valves, fuel injector, spark plug, etc.

The controller 12 receives signals from the various sensors of FIG. 1 and employs the various actuators of FIG. 1 to adjust engine operation based on the received signals and instructions stored on a memory of the controller 12. In one example, the controller 12 may use an engine torque output estimate received from a crankshaft speed sensor 41 and a torque converter torque output estimate received from a transmission input shaft speed sensor to calculate a PTO device torque demand, and in order to deliver the desired PTO torque, the controller 12 may adjust one or more of a fueling schedule of the fuel injector 66, spark timing of a spark plug, and throttle plate 64 position of a throttle 62 to adjust the engine speed profile (e.g., using proportional-integral-derivative (PID) control) and provide a desired engine torque output.

It will be appreciated that in a further representation, the engine system 100 may be a diesel engine system operated using diesel as fuel. In a diesel engine, the spark ignition system may be replaced by a compression ignition system. In another example, engine system 100 may be a part of a hybrid electric vehicle or a plug-in hybrid electric vehicle. A PTO device may be coupled to vehicles comprising each of a gasoline engine, a diesel engine, and a hybrid drive train.

In this way, the systems of FIGS. 1 and 2 provide for a vehicle system comprising: an engine, a crankshaft speed sensor, a power take off (PTO) device coupled to the engine, a first and a second PTO switch, a torque converter coupling the engine to a transmission system, a transmission input shaft speed sensor, and a controller with computer readable instructions stored on non-transitory memory for: in response to actuation of the first PTO switch, initiating a first static PTO device operation mode wherein the vehicle is stationary and a PTO torque demand is met using engine torque, and in response to actuation of the second PTO switch, initiating a second mobile PTO device operation mode wherein the vehicle is mobile and each of the PTO torque demand and wheel torque is met using engine torque, as driver demand changes.

Figure 3:
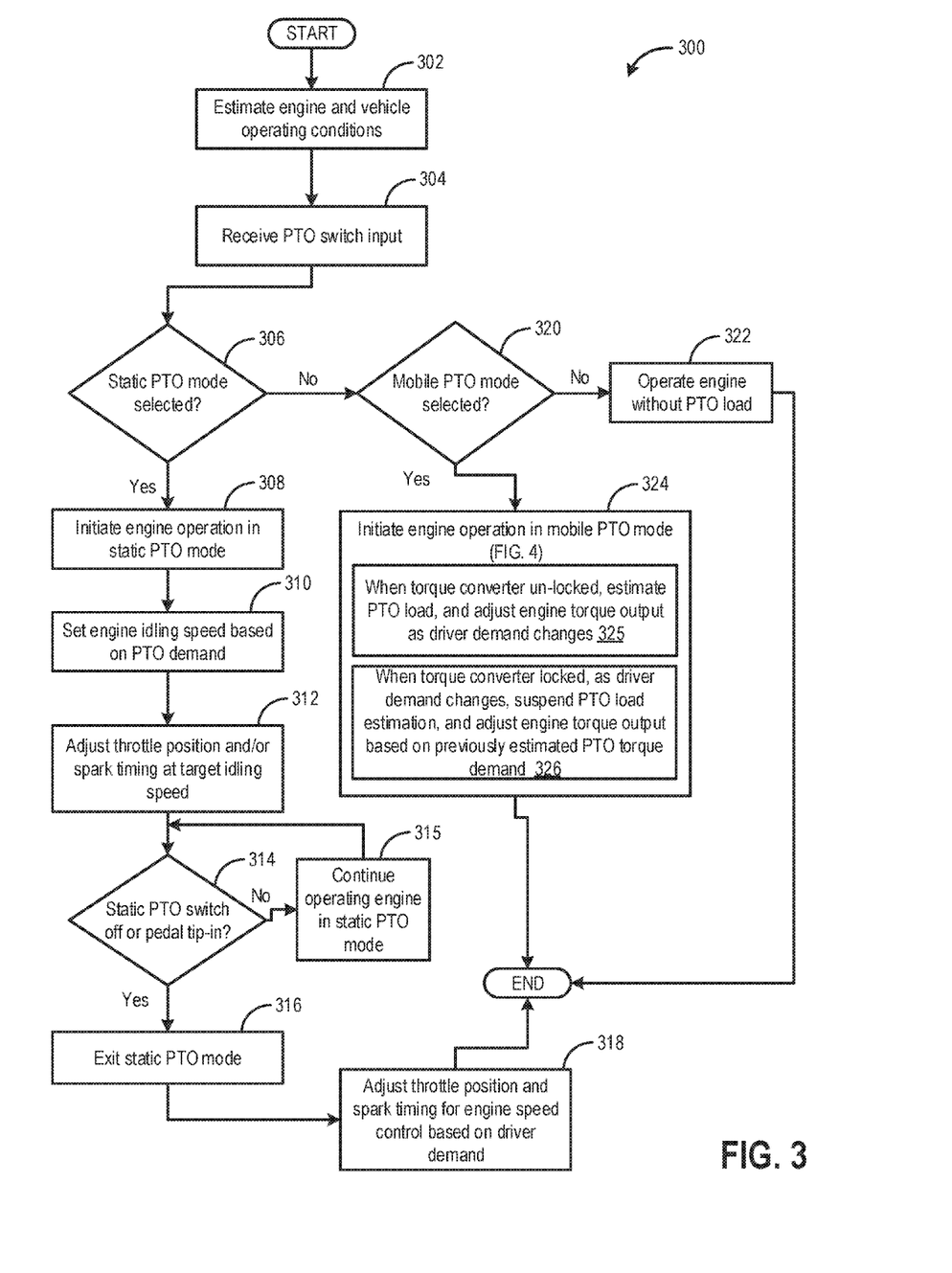
FIG. 3 shows a flow chart illustrating an example method that may be implemented to operate a PTO device in a static mode.

FIG. 3 illustrates an example method 300 for operating a power take-off (PTO) device (such as the PTO device 12 in FIG. 1) in a static mode such as when the vehicle is stationary. Instructions for carrying out method 300 and the rest of the methods included herein may be executed by a controller based on instructions stored on a memory of the controller and in conjunction with signals received from sensors of the engine system, such as the sensors described above with reference to FIG. 2. The controller may employ engine actuators of the engine system to adjust engine operation, according to the methods described below.

At 302, engine and vehicle operating conditions may be determined by the controller based on inputs from a plurality of sensors. The engine operating conditions may include vehicle speed, engine load, engine temperature, engine speed, driver torque demand, transmission gear ratio, etc.

At 304, the controller may receive an input from PTO device control switches in the dashboard (such as switches 127 and 128 in FIG. 2). A vehicle operator may actuate a switch to select between a static PTO mode of operation, wherein a PTO device is operated while the vehicle is stationary, and a mobile PTO mode of operation, wherein the PTO device is operated with the vehicle in motion. At 306, the routine includes determining if the static PTO mode is selected/actuated by the operator via switch input.

If it is confirmed that the static PTO mode is selected by the operator, at 308, the controller may initiate engine operation in static PTO mode. In order to initiate operation in the static mode, the controller may confirm that the vehicle is stationary and there is no torque demand for vehicle propulsion (e.g., the operator has not depressed the accelerator pedal). In addition, the controller may confirm that the engine speed has been elevated to a threshold speed (above Engine Idle rotation per minute (RPM) Speed) before the static mode operation was requested (e.g., the operator actuated the static mode switch) wherein the controller may raise the engine speed to a predetermined threshold. At 310, in response to the request for operation in the static mode, the engine speed may be increased and set at a static mode idling speed (target speed) based on PTO torque demand. The static mode idling speed may be higher relative to the idling speed applied during engine operation without the PTO load. Since the vehicle is stationary, the engine torque generated by the engine at the target engine speed may be entirely utilized for PTO operation and is not delivered to the torque convertor. The engine speed may be continually adjusted based on changes in PTO load. For example, the engine speed may be raised as PTO load increases and the engine speed may be lowered (but not below the static mode idling speed) as PTO load decreases. At 312, during operation in the static PTO mode, the controller may adjust one or more engine torque actuators, such as each of a throttle position, spark timing, and fueling schedule of the engine to maintain the target engine speed and to produce sufficient engine torque output to meet the varying torque demand (that is, load) of the PTO device. In this way, by setting a target engine idling speed based on PTO load, and adjusting engine operation to maintain the target engine idling speed, a PTO device may be operated in a static mode.

At 314, the routine includes determining if the static PTO switch has been turned off/disabled or if there has been a change in accelerator pedal position (such as a tip-in event) caused by the operator. As one example, PTO device operation may be discontinued in response to a driver pedal event/change in driver demand received while operating a PTO device via an engine in a static mode. If it is confirmed that the static PTO switch has been turned off or there is a pedal tip-in event, at 316, the controller may exit (suspend) engine operation in the static PTO mode. Since the static PTO mode is operational solely during conditions when the vehicle is stationary, vehicle movement upon pedal tip-in may cause suspension in static PTO operation. At 318, one or more of the throttle position, spark timing, and fueling schedule may be adjusted for engine speed control based on driver demand and independent of the PTO load. Since at this time the PTO device is no longer being operated by the engine, the entire engine torque may be utilized for providing the driver demand. In this way, by setting a target engine idling speed based on PTO load, and adjusting engine operation to maintain the target engine idling speed, a PTO device may be operated in a static mode.

If at 306 it is determined that the static PTO mode is not selected, at 320, the routine includes determining if a mobile PTO mode has been selected by the operator. In the mobile PTO mode, a PTO device may be operated during vehicle motion. In this mode, the total engine torque may be divided between the PTO torque and the torque converter torque (which then goes on to the wheel torque to propel the vehicle). If it is determined that the mobile PTO mode has been selected, at 324, the controller may initiate engine operation in mobile PTO mode wherein a portion of the engine torque is used to support operation of the PTO device and the remaining torque is used for vehicle operation. Operating the mobile PTO mode includes, at 325, during conditions when the torque converter is unlocked (or is in the process of being unlocked), such as when the vehicle is operating at a lower than threshold vehicle speed (e.g., less than 40 or 45 mph), the PTO load may be continually estimated, and engine operation may be correspondingly adjusted to meet the changes in driver demand while maintaining operation of the PTO device. In other words, engine output torque may be continually adjusted to meet the varying PTO load as well as the varying driver demand/wheel torque. As such, during conditions when the vehicle speed is higher than the threshold, such as at or above 40 or 45 mph, the torque converter may be locked via a lock up clutch. During such conditions, the torque convertor operates as a fluidic coupling between the engine and the transmission system and enables torque multiplication. As such, when the torque converter is locked, PTO load estimation based on engine torque relative to transmission input torque (or torque converter output torque) may be inaccurate. Therefore, at 326, operating in the mobile PTO mode includes, during conditions when the torque converter is locked, suspending the PTO load estimation. At that time, a previously estimated (such as during an immediately preceding period of operation with torque converter unlocked) PTO load (or PTO torque demand) value may be utilized for adjusting engine torque output, as driver demand changes.

Figure 4:
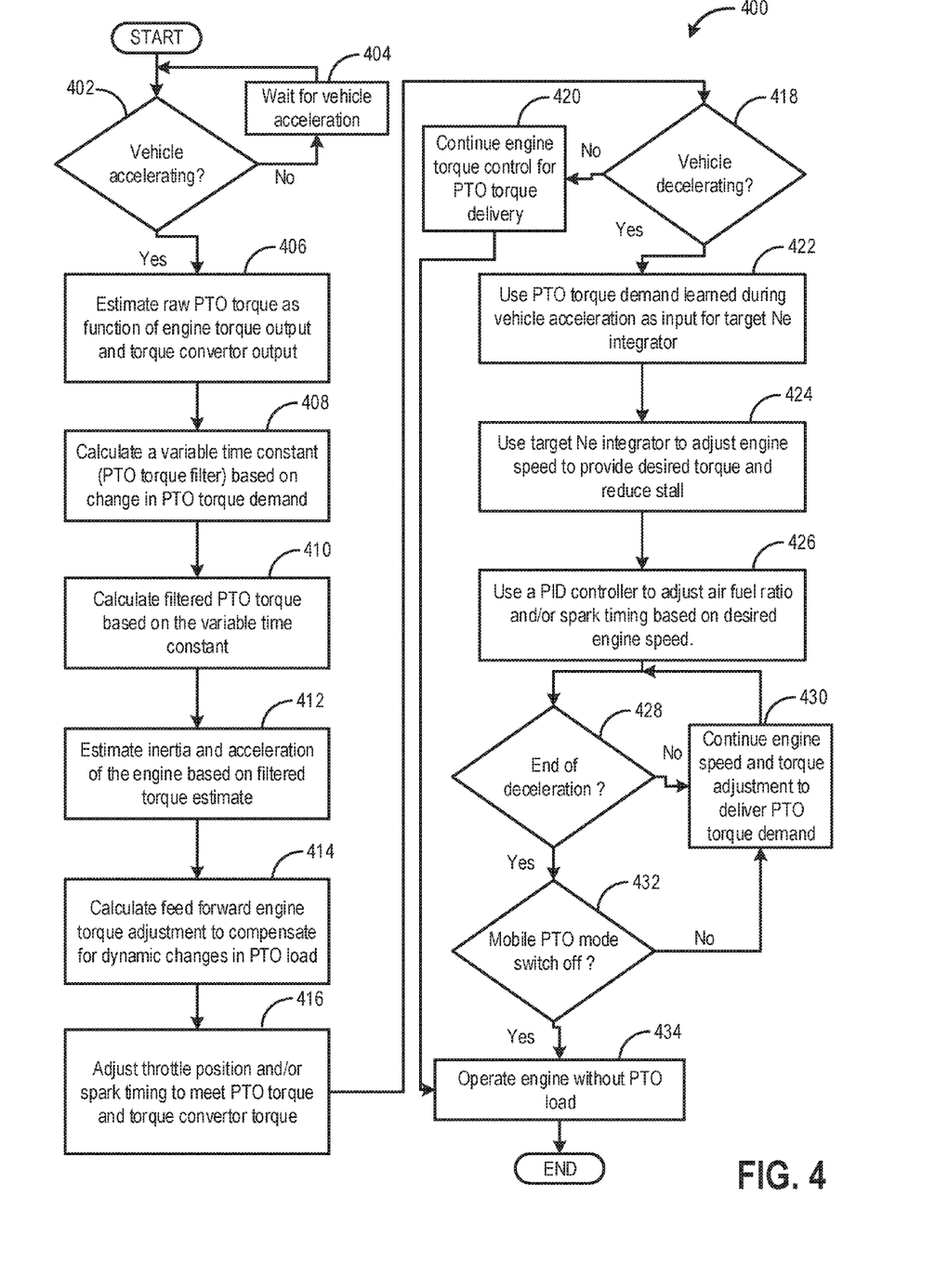
FIG. 4 shows a flow chart illustrating an example method that may be implemented to operate a PTO device in a mobile mode.
Figure 5:
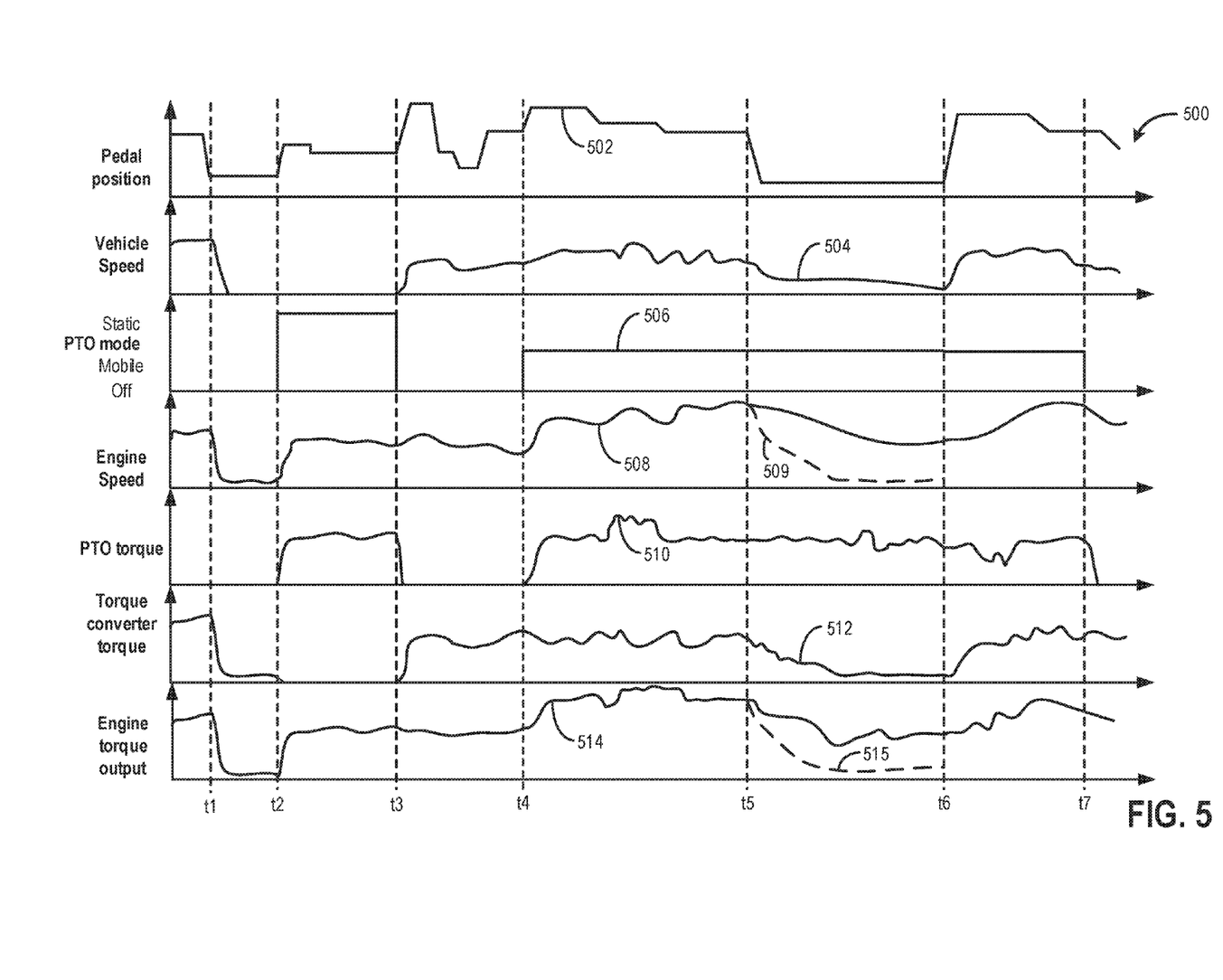
FIG. 5 shows an example of PTO device operation in the static and the mobile mode, according to the present disclosure.

Detailed description of engine operation in mobile PTO mode, including an estimation of the PTO load and use of the estimated PTO load to adjust engine output, is discussed in FIG. 4.

FIG. 4 illustrates an example method 400 for operating a power take-off (PTO) device (such as the PTO device 12 in FIG. 1) in a mobile mode such as when the vehicle is in motion. At 402, upon initiation of the mobile PTO mode (as discussed in step 326 of FIG. 3) the routine includes determining if the vehicle is accelerating. During vehicle acceleration, each of the torque demand for vehicle operation and the torque demand for PTO operation may be requested by the operator by increasing the tip-in position of the accelerator pedal. By increasing the tip-in, sufficient engine torque may be generated for concurrent vehicle and PTO operations. Determining if the vehicle is accelerating may include confirming that the torque converter is unlocked. As elaborated earlier, PTO load estimation may be accurately performed when the torque converter is unlocked, such as when the vehicle is operating at lower than a threshold speed (e.g., lower than 45 mph). If it is determined that the vehicle is not currently accelerating, at 404, the controller may wait for vehicle acceleration before continuing the calculation of the PTO Load estimate. It will be appreciated that if the torque converter is locked, such as higher than the threshold speed, the controller may temporarily suspend the estimation of the PTO load until the torque converter is unlocked. In the meantime, the demanded PTO torque may be met by adjusting engine output based on an earlier PTO load/torque estimate or a default (e.g., average) PTO torque estimate.

If it is confirmed that the vehicle is accelerating (and the torque converter is unlocked), at 406, a raw unfiltered PTO torque (or PTO load) as requested by the PTO device may be estimated as a function of engine torque output and torque converter torque output. Alternatively, the raw unfiltered PTO torque may be estimated based on engine torque output and one or more of a torque converter torque input, a transmission system torque input, and a transmission system torque output. The engine torque output may be estimated via a crankshaft speed sensor and the torque converter torque output may be estimated via a transmission input shaft speed sensor, the transmission coupled to the torque converter downstream of the torque converter in a torque flow sense. In one example, the raw unfiltered PTO torque may be determined using equation 1:

$$T_{pto\_r} = T_{eng} - f(T_{tc}), \quad (1)$$

wherein, $T_{pto\_r}$ is the raw PTO torque, as calculated from $T_{eng}$ which is the total engine torque output as a feedforward deliverable, and $f(T_{tc})$ which is a function of the torque converter torque output as a feed forward deliverable across an open torque convertor. Thus the difference is uncompensated PTO load or an uncompensated torque drain across the engine.

At 408 a variable time constant may be calibrated based on a difference between the actual PTO Load and a PTO load setpoint. Thus one would set a higher gain for a higher torque difference. The PTO load may vary based on operating conditions of the PTO device. The variable time constant may be used at step 410 to calculate a filtered PTO torque demand taking into account fluctuations in the PTO load over time. In one example, the variable constant is based on average fluctuations in the desired (raw) PTO torque over a duration of vehicle travel while the vehicle is accelerating or operating at steady-state speeds.

At 412, acceleration of the engine may be calculated and filtered using an instantaneous derivative of engine speed and the calibrated mobile PTO time constant. In addition, an inertia term which is an additional gain factor on this filtered acceleration term may be estimated.

At 414, feed-forward engine torque adjustments may be calculated to compensate for dynamic changes in the PTO load. The feed-forward adjustments may be carried out as a function of the raw (unfiltered) PTO load and the filtered PTO load. The feed-forward torque adjustment may be kept constant during small changes in the PTO torque. However, for larger changes observed in PTO torque, torque input to a controller for engine speed and engine torque control may be calibrated. Based on raw and filtered PTO torque, at 416, a controller, such as a proportional-integral-derivative (PID) controller may schedule gains to adjust one or more of throttle position, spark timing, and fueling schedule to meet PTO torque and torque converter torque demands. The gains of the controller may be adjusted based on PTO load, and variations in PTO load. As an example, the gains may be increased when the PTO load increases. In this way, engine torque may be adjusted to facilitate PTO device operation while the vehicle is in motion.

At 418, the routine includes determining if the vehicle is subsequently decelerating. The vehicle may be decelerating during a tip-out event following the preceding tip-in event. Correspondingly, the PTO torque delivery may be adapted due the deceleration event. If it is determined that the vehicle is not decelerating (such as during a steady-state vehicle operation), at 420, engine torque control may be continued to maintain PTO torque and driveline torque (e.g., torque converter torque) delivery.

As such, when the vehicle is decelerating while the PTO device is concurrently operated via the engine, there is a risk that the engine and vehicle may stall. This is due to the engine output torque being decreased to meet the drop in driver demand (thereby improving driveability and reducing a run-off feel). However, during the spin-down, the continued presence of the PTO load may cause the engine to spin down faster than desired, resulting in a stall. To mitigate this issue, the controller may use the PTO load learned during the preceding acceleration event to adjust the engine speed profile during the subsequent deceleration event. Also, during vehicle operation when the torque converter is locked, PTO load estimation may be erroneous, therefore during such conditions, the PTO load learned during the preceding period when the torque converter was unlocked may be used for adjusting engine torque output. Specifically at 422, PTO torque demand learned during vehicle acceleration and/or during torque converter unlocked condition may be used as an input to a target engine speed (Ne) controller which controls engine speed profile during the decrease in torque demand. Therefore during vehicle deceleration, the engine controller may transition from torque control to engine speed control in order to provide the requested PTO torque. At 424, the target Ne controller may be used to adjust the engine speed profile such that the desired (learned) PTO torque demand may be sustained even as driver demand decreases, thereby reducing possibility of engine stalls. Adjusting the engine speed (ramp-down) profile includes scheduling a gain for one or more engine torque actuators based on the learned PTO torque demand to ramp-down the engine speed at a slower rate responsive to the decrease in driver demand as the learned PTO torque demand increases. The target Ne controller may comprise a PID controller.

At 426, the PID controller may be used to schedule gains in order to adjust one or more of throttle position, spark timing, and fueling schedule to meet PTO torque and torque converter torque demands. The target speed for the PID (target Ne) controller may be calibrated based on parameters such as transmission input, vehicle speed, change in driver demand, etc. with respect to the present PTO Load. By using a target Ne controller during deceleration events, engine speed may be reduced at a slower rate and sufficient engine torque may continue to be delivered to a PTO device. Therefore, during operation of a PTO load, transition from an accelerating phase to a decelerating phase of the vehicle may take place smoothly without causing engine stalls. After decreasing the engine speed responsive to the decreased torque demand, the target Ne controller may maintain the engine speed at an idling speed at which sufficient engine torque may be generated for PTO device operation and from where vehicle operation can be resumed quickly if the driver demand increases.

At 428, the routine includes determining if the deceleration phase has come to an end. At this step, the routine may also include determining if the torque converter has been unlocked. If it is determined that the vehicle is continuing to decelerate and/or the torque converter is in locked condition, at 430, the target Ne controller may continue to adjust engine speed and consequently engine torque to maintain the PTO torque even as driveline torque demand decreases. If it is determined that the vehicle is no longer decelerating and/or the torque converter has been unlocked, at 432, the routine includes determining if the mobile PTO mode has been switched off by the operator thereby suspending the use of the PTO device. If it is determined that the mobile PTO has not been switched off, the routine may proceed to step 430 wherein engine speed and/or engine torque may be adjusted for optimal PTO torque delivery while providing the requested driveline torque demand.

It will be appreciated that each time the vehicle accelerates, the controller may operate the routine iteratively to relearn the PTO load during the acceleration event so as to adjust the engine torque in view of the learned PTO load during a subsequent transition between engine states. For example, the controller may start with the most recently learned PTO torque estimate and update the estimate on each vehicle acceleration event. The controller may then use the updated PTO load to adjust an engine spin-down speed profile during a subsequent vehicle deceleration event.

If it is determined that the mobile PTO mode has been suspended, at 434, the engine may be operated without the PTO load. Each of the throttle position, spark timing, and fueling schedule may be adjusted based on driveline torque demand and may no longer depend on the PTO load.

In this way, a PTO device coupled to an engine of a vehicle may be operated seamlessly via the engine while the vehicle is moving and as driver demand changes. During an increase in driver demand/tip-in event, a PTO torque demand may be learned based on engine output torque relative to transmission input torque; and during a subsequent decrease in driver demand/tip-out event, the engine output torque may be adjusted based on the decrease in driver demand and further based on the PTO torque demand. Therefore, the PTO estimated torque may be adjusted with flexibility as it changes during a deceleration event and the target-Ne controller may be updated in real time.

FIG. 5 shows an example operating sequence 500 illustrating an example operation of a power take-off (PTO) device under different vehicle operating conditions. A PTO device may be coupled to the vehicle engine and may be operated using engine torque. The horizontal axis (x-axis) denotes time and the vertical markers t1-t7 identify significant times in the operation of the vehicle and the PTO device.

The first plot, line 502, shows change in accelerator pedal position over time. The second plot, line 504, shows variation in vehicle speed profile over time. The third plot, line 506, shows the mode of operation of the PTO device. An operator may use a PTO mode activation switch to select one of a static PTO mode wherein the PTO device is operated when the vehicle is stationary, and a mobile PTO mode wherein the PTO device is operated when the vehicle is in motion (propelled using engine torque). The fourth plot, line 508, shows a variation in engine speed profile over time. Dotted line 509 shows change in engine speed during vehicle deceleration, when a target engine speed (Ne) is not used for speed control. The fifth plot, line 510, shows variations in PTO device torque demand during PTO device operation. The sixth plot, line 512, shows variation in torque converter torque output based on vehicle operating conditions. The seventh plot, line 514, shows total engine torque output corresponding to vehicle, and PTO device operations. The engine torque output is a function of the PTO device torque demand and the torque converter torque output. Dotted line 515 shows change in engine torque output during vehicle deceleration, when a target engine speed (Ne) is not used for engine speed control.

Prior to time t1, the vehicle is operated without any PTO load. Therefore, the PTO mode activation switch may be in an off position. The vehicle is in motion and each of the vehicle speed and engine speed is adjusted by the controller based on operator demand (as inferred from the accelerator pedal position). During this time, the engine torque output may be directly proportional to the torque converter torque output since all the engine torque is being delivered to the driveline to propel the vehicle.

At time t1, the operator decelerates and then stops the vehicle from its state of motion. Consequently, the vehicle speed, the engine torque output, and the torque convertor torque output decreases to zero and the engine speed reduces to an idling speed. Between time t1 and t2, the vehicle is maintained in a stationary state without operation of any PTO device.

At time t2, the operator may activate the operation of the PTO device by actuating a PTO operation switch to a first static mode position, thereby initiating a static PTO operating mode. In the PTO static mode, engine torque output may be used for operating the PTO device and not for propelling the vehicle. Between time t2 and t3, the PTO device is continued to be operated in the static mode and in order to provide optimal PTO torque, the engine speed is maintained at the target idle speed via adjustments to one or more of throttle position, fueling schedule, and spark timing. During this time, the vehicle continues to be stationary that is operating at zero vehicle speed.

At time t3, the operator may change the accelerator pedal position and there may be a tip-in event. The static mode may operate only during conditions when the vehicle is in neutral or park gear setting, the emergency brake is activated, the accelerator pedal is not being touched, the vehicle speed is zero, and the brake pedal is not being touched. In response to the tip-in, the vehicle may start moving and the static mode may be terminated. At this time, the static mode is disabled without the operator actively requesting the mode be deactivated by moving the PTO switch out of the first static mode position. Once the vehicle is moving, the PTO device may no longer be operated in the static PTO mode and therefore the static PTO mode may be terminated.

Between time t3 and t4, in order to propel the vehicle, the pedal position may be varied by the operator and consequently there may be changes to the engine speed, engine torque output, the torque converter torque, and the vehicle speed. During this time, the entire engine torque output is utilized by the torque converter and the PTO torque is maintained at zero.

At time t4, the operator may activate the PTO operation switch to a second mobile mode position, thereby initiating a PTO mobile mode. In the PTO mobile mode, engine torque output may be used for each of operating the PTO device and providing driveline torque (herein represented by the torque convertor torque). At this time, the torque converter may be unlocked and the vehicle may be operating at a lower speed. Between time t4 and t5, the engine speed is continually adjusted by the operator via adjustments to the accelerator pedal position in order to increase engine speed such that sufficient engine torque may be generated to operate the PTO device and propel the vehicle. During acceleration, the PTO load may be estimated by computing a raw unfiltered PTO load based on a difference between the engine torque output and the torque converter torque output, and computing a filtered PTO load based on the raw PTO load and a variable time constant, the variable time constant based on fluctuations in instantaneous PTO load from the raw PTO load. During vehicle acceleration and steady-state vehicle operation, a feed-forward estimate of engine torque output may be updated based on the filtered PTO load, and one or more engine torque actuators (such as spark timing, throttle position, and fuel injection pulse-width) may be adjusted to provide the feed-forward estimate of engine torque output.

At time t5, the vehicle may start decelerating (tip-out) and the operator may no longer adjust pedal position to provide sufficient torque desired for PTO operation. During transition between engines states such as during a deceleration event, when there is a decrease in engine torque demand, the PTO torque demand learned during vehicle acceleration may be used for adjusting engine speed profile and the engine torque output. In response to the deceleration, between time t5 and t6, the controller uses the filtered PTO torque demand learned during vehicle acceleration (between time t4 and t5) as an input to a target engine speed (Ne) controller that adjusts the engine speed profile such that torque desired by the PTO device continues to be delivered even as the driver demand ceases. A proportional-integral-derivative (PID) control may be used to control the rate of decrease of engine speed during the deceleration event. The PID controller may schedule gains for adjusting one or more of throttle position, fueling schedule, and spark timing responsive to engine speed and the filtered PTO load via the target Ne controller to maintain the engine (wheel) torque output at a desired level as driver demand changes. The desired (target) engine speed may be calibrated based on input from the transmission as well as factors such as vehicle speed. During this time, torque converter torque output reduces at a faster rate and the engine torque output may be used primarily for PTO operation. In one example, if the target Ne controller had not been used for engine speed control during vehicle deceleration, the engine speed may have decreased at a faster rate as shown by dotted line 509, causing a lower engine torque output (as shown by dotted line 515). Due to the higher than desired rate of drop in engine speed while the PTO device is in operation, there may be potential engine stalls during engine transitions from an accelerating phase to a decelerating phase.

At time t6, the vehicle may start accelerating once again (tip-in) and the vehicle speed increases. Consequently, between time t6 and t7, the engine speed may be adjusted by the operator via adjustments to the accelerator pedal position in order to provide sufficient engine torque for both PTO device operation and vehicle movement. The filtered PTO torque demand may be used by a feed forward control system for engine speed and engine torque output adjustments. During this time the engine torque is utilized for both PTO operation and torque convertor torque demand.

At time t7, the operator may terminate the mobile PTO mode via the PTO operation switch. In response to the termination of the mobile PTO mode, engine torque may no longer be used for PTO device operation. At this time, the PTO torque may decrease to zero. The pedal position may be adjusted to control engine speed and provide sufficient engine torque output which may be primarily used by the torque converter for vehicle movement. In this way, a PTO device may be operated under different vehicle driving conditions including both stationary and mobile conditions with reduced possibility of engine stalls and stumbles.

Figure 6:
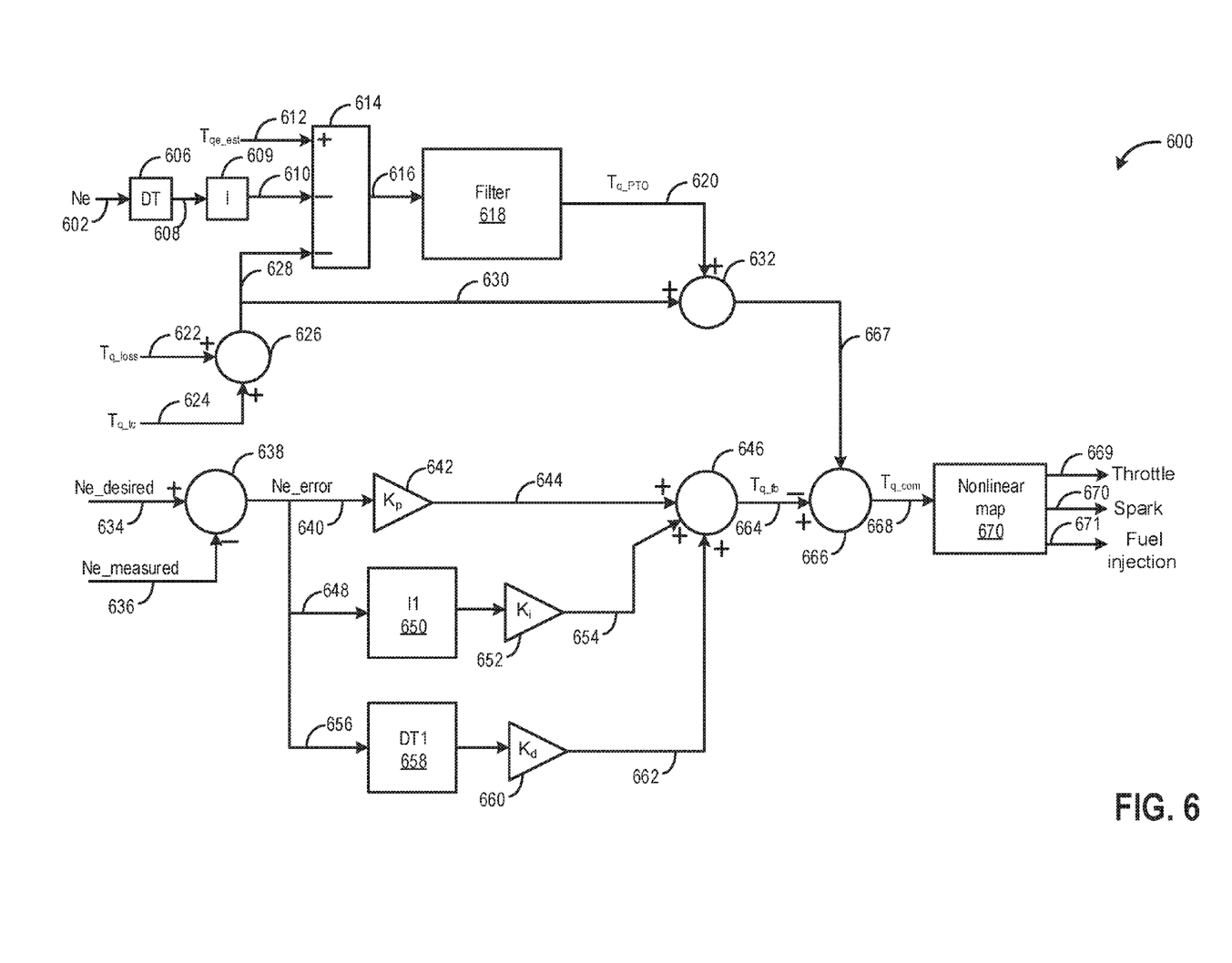
FIG. 6 shows a block diagram of an example control routine used for engine speed control during PTO device operation.

FIG. 6 shows an example control scheme 600 which may be used by a vehicle controller such as a target engine speed (Ne) controller for adjusting engine speed via adjustments to throttle position, spark timing, and fuel injection during operation of a power take-off (PTO) device coupled to the vehicle engine. The control scheme 600 may be used for engine speed control during PTO device operation in mobile mode, wherein the vehicle is in motion and engine torque is simultaneously supplied to a torque converter and to the PTO device. In the description herein, a signal may refer to an electrical signal such as an electric current, and modification of a signal may refer to a change in voltage corresponding to the electric current.

A controller 614 may receive an engine torque estimate ($T_{qe\_est}$) 612 as estimated via a crankshaft speed sensor as a first input. An engine speed signal (Ne) 602 may be differentiated by a differentiator (DT) 606 and the differentiated signal 608 may be subsequently integrated by an integrator 609. The output signal 610 of the integrator 609 may be used as a second input to the controller 614. Parasitic losses in engine torque ($T_{q\_loss}$) 622 due to operation of components such as coolant pumps, engine oil pumps, etc., may be used as a first input and a torque converter torque input ($T_{q\_tc}$) 624 as estimated via a transmission input shaft speed sensor may be used as a second input to an adder 626. The output signal 628 of the adder 626 may indicate the engine torque used for vehicle operation, not taking into account a PTO device torque demand. The output signal 628 may be used a third input to the controller 614. At the controller 614, the signals 610 and 628 may be subtracted from the engine torque estimate signal 612.

The output signal 616 of the controller 614 provides an estimate of a raw unfiltered PTO torque demand. The signal 616 may be used as an input to a low-pass filter 618. At the filter 618, a time constant computed based on the raw PTO load, and fluctuations in raw PTO load, may be used for estimating a filtered PTO load. The output of the filter, the filtered PTO load ($T_{q\_PTO}$) 618 may be used as a first input to an adder 632. The output signal of the adder 626 indicating the engine torque utilized for vehicle operation (not including PTO torque demand) may be used as the second input 630 to the adder 632. The output signal 667 of the adder 632 may correspond to the total engine torque utilized for each of vehicle and PTO operation.

A subtractor 638 may receive a desired engine speed estimate (Ne_desired) 634 as estimated based on current vehicle operating conditions, driver demand, and PTO torque demand as a first input. An estimate of the current engine speed (Ne_measured) 636 as estimated via a crankshaft speed sensor may be used as a second input to the subtractor 638. The subtractor 638 may compute the difference (Ne_error) between the desired engine speed and the estimated engine speed and produce output signals 640, 648, and 656 which are directed to distinct branches of a PID controller. The signals 640, 648, and 656 may be processed and/or modified separately by a proportional gain ($K_p$) 642, an integrator block 650 with an integral gain ($K_i$) 652, and a differentiator block (DT1) 658 with a derivative gain ($K_d$) 660, respectively.

The signal 640, upon modification by the proportional gain ($K_p$) 642, may produce proportional term 644. In parallel, the signal 648 may be integrated by the integrator block (I1) 650 and the integral gain ($K_i$) 652 and an integrative term 654 may be generated. Also, the signal 656 may be differentiated by the differentiator block (DT1) 658 and a derivative gain ($K_d$) 660 and a derivative term 662 may be generated. Each of the proportional term 644, the integrative term 654, and the derivative term 662 may be used as inputs to an adder 646. Based on the input signals, the adder 646 may compute a feedback torque estimate ($T_{q\_fb}$) 668. This feedback torque estimate 664 may be used as input to a subtractor 666, wherein the feedback torque estimate 664 may be subtracted from the input signal 667 corresponding to total engine torque utilized for vehicle and PTO operation.

The output signal 668 of the subtractor may represent the torque to be commanded ($T_{q\_com}$) to provide the desired engine speed. The torque to be commanded signal 668 may be used as an input to a nonlinear map (look-up table) 670. A first signal (gain) 669 as estimated from the nonlinear map 670 may be utilized to accordingly adjust an intake throttle position, a second signal (gain) 670 as estimated from the nonlinear map 670 may be utilized to adjust an ignition spark timing signal, and a third signal (gain) 671 as estimated from the nonlinear map 670 may be utilized to adjust fuel injection.

The signal 669 may correspond to a signal to be supplied to an actuator coupled to the throttle for determining a degree of opening of the intake throttle. The signal 670 may correspond to a signal to be supplied to an actuator coupled to the spark plug for adjusting spark timing. The signal 671 may correspond to a signal to be supplied to an actuator coupled to the fuel injectors for adjusting a fueling schedule, such as by varying a fuel pulse-width or duty cycle. The higher the PTO torque demand, the faster the gains may be scheduled. In one example, as filtered PTO torque demand increases, the throttle opening may be increased, and fueling pulse width may be increased to adjust engine torque output as desired for optimal PTO operation and vehicle operation. In another example, if there is a significant decrease in filtered PTO torque demand, the spark timing may be retarded. Further, fuel and/or air may be adjusted to decrease the desired engine torque output.

As an example, when the vehicle is accelerating, the signals $T_{q\_pto}$, $T_{q\_tc}$, and $T_{q\_loss}$ may be continuously computed and directly used for engine speed and engine torque control via adjustments to each of the throttle position, the spark timing, and the fuel injection schedule. During transition from vehicle acceleration to vehicle deceleration, the torque converter torque demand may reduce to zero and the PTO torque demand ($T_{q\_pto}$) learned during vehicle acceleration may be used as input (signal 620) to the adder 632. Subsequently, gains may be scheduled for adjustments of the throttle position, the spark timing, and the fuel injection schedule such that decrease in engine speed may be carried out at a lower rate and the target idle speed may be sufficient to generate torque requested for PTO device operation. In one example, the target idle speed during PTO operation in mobile mode may be higher than the engine idle speed during vehicle operation without the PTO load. In this way, a PID controller may be used for adjusting engine speed and engine torque output based on PTO device torque demand during vehicle acceleration and deceleration.

During vehicle acceleration, a raw unfiltered PTO device torque demand may be estimated based on an engine torque output and a torque converter torque output and a filtered PTO device torque demand may be computed based on the engine torque output, the torque converter torque output, and fluctuations in the raw PTO device torque demand; and during transition between engine states such as during vehicle deceleration, a target engine speed (Ne) controller may be used to adjust (control) engine speed profile and engine torque output based on the filtered PTO torque demand estimated during vehicle acceleration. As such, the vehicle is moving during both the estimating of the PTO load (torque demand) and the transition between engine states, and wherein the adjusting occurs after the estimating.

One example method comprises a method for a vehicle with a power take off (PTO) device coupled to an engine, comprising: estimating a PTO load based on a difference between engine torque output and torque converter torque output; and adjusting engine torque output based on the estimated PTO load during a transition between engine states. In the preceding example, additionally or optionally, the vehicle is moving during both the estimating of the PTO load and the transition between engine states, and wherein the adjusting occurs after the estimating, and wherein a transmission is coupled downstream of the engine in a driveline via a torque converter. In any or all of the preceding examples, additionally or optionally, the learning includes learning the PTO load during vehicle acceleration or during vehicle steady-state travel, and wherein using the learning during a transition includes using the learning during a decrease in engine torque demand responsive to vehicle deceleration. In any or all of the preceding examples, additionally or optionally, the torque converter couples the engine to a transmission, wherein the engine torque output is based on the output of a crankshaft speed sensor, and wherein the torque converter torque output is based on the output of a transmission input shaft speed sensor. In any or all of the preceding examples, additionally or optionally, learning the PTO load based on the difference includes computing a raw unfiltered PTO load based on a difference between the engine torque output and the torque converter torque output, and computing a filtered PTO load based on the raw unfiltered PTO load and variable time constant. In any or all of the preceding examples, additionally or optionally, using the learning during the transition between engine states includes adjusting an engine speed profile during a vehicle deceleration based on a decrease in torque demand during the vehicle deceleration and further based on the filtered PTO load. In any or all of the preceding examples, additionally or optionally, adjusting the engine speed profile includes using each of the filtered PTO load and the decrease in torque demand during the vehicle deceleration as inputs to a target engine speed controller, wherein the target engine speed controller is a proportional-integral-derivative (PID) controller. Any or all of the preceding examples further comprises, additionally or optionally, during vehicle acceleration and steady-state vehicle operation, updating a feed-forward estimate of engine torque output based on the filtered PTO load, and adjusting one or more engine torque actuators to provide the feed-forward estimate of engine torque output, the one or more engine torque actuators including spark timing, throttle position, and fuel injection pulse-width.

Another example method for an engine of a vehicle coupled to a power take-off (PTO) device, comprises, operating the PTO device via the engine while the vehicle is moving and as driver demand changes. In the preceding example, additionally or optionally, the operating includes: during an increase in driver demand/tip-in event, estimating a PTO torque demand based on engine output torque relative to transmission input torque; and during a subsequent decrease in driver demand/tip-out event, adjusting the engine output torque based on the decrease in driver demand and further based on the PTO torque demand. In any or all of the preceding examples, additionally or optionally, the adjusting includes adjusting an engine speed (ramp-down) profile to sustain the estimated PTO torque demand as driver demand decreases. In any or all of the preceding examples, additionally or optionally, adjusting the engine speed (ramp-down) profile includes scheduling a gain for one or more engine torque actuators based on the estimated PTO torque demand to ramp-down the engine speed at a slower rate responsive to the decrease in driver demand as the estimated PTO torque demand increases. In any or all of the preceding examples, additionally or optionally, the PTO torque demand based on engine output torque relative to transmission input torque is a raw unfiltered PTO torque demand, and wherein the estimating includes filtering the raw unfiltered PTO torque demand using a variable time constant, the variable time constant based on fluctuations in instantaneous PTO load from the raw unfiltered PTO load during the increase in driver demand. In any or all of the preceding examples, additionally or optionally, the filtering includes using a variable time constant, the variable time constant based on deviations in inferred PTO load from filtered PTO load during the increase in driver demand.

Yet example method comprises, in response to a first change in driver demand received while operating a PTO device via an engine in a first mode, discontinuing operating the PTO device via the engine; and in response to a second change in driver demand received while operating the PTO device via the engine in a second mode, adjusting engine operation to meet the change in driver demand while maintaining operation of the PTO device. In the preceding example, additionally or optionally, the engine is coupled to a vehicle, and when operating the PTO device in the first mode, the vehicle is stationary, and when operating the PTO device in the second mode, the vehicle is mobile and a torque convertor coupled between the engine and vehicle wheels is unlocked. In any or all of the preceding examples, additionally or optionally, operating the PTO device via the engine in the first mode includes setting a target engine idling speed based on PTO load, and adjusting engine operation to maintain the target engine idling speed; and wherein operating the PTO device via the engine in the second mode includes adjusting engine operation based on the PTO load to maintain a wheel torque as driver demand changes. In any or all of the preceding examples, additionally or optionally, the first change in driver demand includes an increase in driver demand, and wherein the second change in driver demand includes an increase or a decrease in driver demand. Any or all of the preceding examples further comprises, additionally or optionally, when the second change in driver demand is the increase in driver demand, learning a PTO load on the engine based on engine output torque relative to torque converter output torque, and wherein when the second change in driver demand is the decrease in driver demand, using the learned PTO load to adjust engine output torque. In any or all of the preceding examples, additionally or optionally, learning the PTO load includes estimating a raw unfiltered PTO load based on a difference between the engine output torque and the torque converter output torque, and further estimating a filtered PTO load based on a variation in the raw unfiltered PTO load over a duration, the engine operation adjusted based on the filtered PTO load. Any or all of the preceding examples further comprises, additionally or optionally, while operating in the second mode, scheduling gains for adjusting one or more of throttle position, fueling schedule, and spark timing responsive to engine speed and the filtered PTO load via the target Ne controller to maintain the wheel torque as driver demand changes.

In a further representation, a vehicle system comprises an engine; a crankshaft speed sensor; a power take off (PTO) device coupled to the engine; a first and a second PTO switch; a torque converter coupling the engine to a transmission system; a transmission input shaft speed sensor; and a controller with computer readable instructions stored on non-transitory memory for: in response to actuation of the first PTO switch, initiating a first static PTO device operation mode wherein the vehicle is stationary and a PTO torque demand is met using engine torque; and in response to actuation of the second PTO switch, initiating a second mobile PTO device operation mode wherein the vehicle is mobile and each of the PTO torque demand and wheel torque is met using engine torque, as driver demand changes. In the preceding example, additionally or optionally, PTO device operation in the second mobile mode includes: during vehicle acceleration, estimating an engine torque output via the crankshaft speed sensor, estimating a torque converter torque output via the transmission input shaft speed sensor, estimating a raw unfiltered PTO device torque demand and a filtered PTO device torque demand based on the engine torque output, the torque converter torque output, and fluctuations in the raw unfiltered PTO device torque demand; and during vehicle deceleration, using a target engine speed (Ne) controller to control engine speed profile and engine torque output based on the filtered PTO torque demand estimated during vehicle acceleration. In any or all of the preceding examples, additionally or optionally, engine speed profile and engine torque output control is carried out via adjustments to one or more of throttle position, fueling schedule, and spark timing.

The technical effect of continually estimating PTO torque demand and variation in PTO torque demand during vehicle acceleration is that a part of the engine torque output may be effectively utilized for PTO device operation during accelerating and steady state phases and also during transitions to decelerating phases. Therefore, in addition to operating a PTO device when the vehicle is stationary, the PTO device may be operated during vehicle motion. By using a target engine speed (Ne) controller to reduce a rate of decrease in engine speed during vehicle deceleration, potential engine stalls and stumbles caused by PTO device operation during a tip-out event may be reduced. By adjusting the engine idle speed, the PTO device operation may be seamlessly continued during transitions in engine operation. By enabling a PTO device to be operated during both stationary and mobile vehicle conditions, a range of PTO usage may be extended.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle with a power take off (PTO) device coupled to an engine, comprising:
    estimating a PTO load based on a difference between engine torque output and torque converter torque output; and
    adjusting engine torque output based on the estimated PTO load during a transition between engine states.

2. The method of claim 1, wherein the vehicle is moving during both the estimating of the PTO load and the transition between engine states, and wherein the adjusting occurs after the estimating, and wherein a transmission is coupled downstream of the engine in a driveline via a torque converter.

3. The method of claim 2, wherein the torque converter couples the engine to the transmission, wherein the engine torque output is based on output of a crankshaft speed sensor, and wherein the torque converter torque output is based on output of a transmission input shaft speed sensor.

4. The method of claim 1, wherein the estimating includes learning the PTO load during vehicle acceleration or during vehicle steady-state travel, and wherein using the estimation during the transition includes using the learning during vehicle deceleration.

5. The method of claim 1, wherein estimating the PTO load based on the difference includes computing a raw unfiltered PTO load based on a difference between the engine torque output and the torque converter torque output, and computing a filtered PTO load based on the raw unfiltered PTO load and a variable time constant.

6. The method of claim 5, wherein using the estimation during the transition between engine states includes adjusting an engine speed profile during a vehicle deceleration based on a decrease in torque demand during the vehicle deceleration and further based on the filtered PTO load.

7. The method of claim 6, wherein adjusting the engine speed profile includes using each of the filtered PTO load and the decrease in torque demand during the vehicle deceleration as inputs to a target engine speed controller, wherein the target engine speed controller is a proportional-integral-derivative (PID) controller.

8. The method of claim 5, further comprising, during vehicle acceleration and steady-state vehicle operation, updating a feed-forward estimate of engine torque output based on the filtered PTO load, and adjusting one or more engine torque actuators to provide the feed-forward estimate of engine torque output, the one or more engine torque actuators including spark timing, throttle position, and fuel injection pulse-width.

9. A method for an engine of a vehicle coupled to a power take-off (PTO) device, comprising:
    operating the PTO device via the engine while the vehicle is moving and as driver demand changes,
    wherein the operating includes:
        during an increase in driver demand, estimating a PTO torque demand based on engine output torque relative to transmission input torque; and
        during a subsequent decrease in driver demand, adjusting the engine output torque based on the decrease in driver demand and further based on the PTO torque demand.

10. The method of claim 9, wherein the adjusting includes adjusting an engine speed profile to sustain the estimated PTO torque demand as driver demand decreases.

11. The method of claim 10, wherein adjusting the engine speed profile includes scheduling a gain for one or more engine torque actuators based on the estimated PTO torque demand to ramp-down engine speed at a slower rate responsive to the decrease in driver demand as the estimated PTO torque demand increases.

12. The method of claim 9, wherein the PTO torque demand based on engine output torque relative to transmission input torque is a raw PTO torque demand, and wherein the estimating includes filtering the raw PTO torque demand.

13. The method of claim 9, wherein filtering includes using a variable time constant, the variable time constant based on deviations in inferred PTO load from filtered PTO load during the increase in driver demand.

14. A method for an engine, comprising:
    in response to a first change in driver demand received while operating a PTO device via the engine in a first mode when a vehicle is stationary, discontinuing operating the PTO device via the engine; and
    in response to a second change in driver demand received while operating the PTO device via the engine in a second mode when the vehicle is mobile, adjusting engine operation to meet the second change in driver demand while maintaining operation of the PTO device.

15. The method of claim 14, wherein the engine is coupled to the vehicle, and when operating the PTO device in the second mode, a vehicle speed is greater than zero and a torque converter coupled between the engine and vehicle wheels is unlocked.

16. The method of claim 14, wherein operating the PTO device via the engine in the first mode includes setting a target engine idling speed based on PTO load, and adjusting engine operation to maintain the target engine idling speed; and wherein operating the PTO device via the engine in the second mode includes adjusting engine operation based on the PTO load to maintain a wheel torque as driver demand changes.

17. The method of claim 14, wherein the first change in driver demand includes an increase in driver demand, and wherein the second change in driver demand includes an increase or a decrease in driver demand, the method further comprising, when the second change in driver demand is the increase in driver demand, estimating a PTO load on the engine based on engine output torque relative to torque converter output torque, and wherein when the second change in driver demand is the decrease in driver demand, using the estimating PTO load to adjust engine output torque.

18. The method of claim 17, wherein estimating the PTO load includes estimating a raw PTO load based on a difference between the engine output torque and the torque converter output torque, and further estimating a filtered PTO load based on a variation in the raw PTO load over a duration, the engine operation adjusted based on the filtered PTO load.

19. The method of claim 17, further comprising, while operating in the second mode, scheduling gains for adjusting one or more of throttle position, fueling schedule, and spark timing responsive to engine speed and filtered PTO load via a target Ne controller to maintain wheel torque as driver demand changes.

* * * * *